United States Patent [19]

Korsky et al.

[11] Patent Number: 4,894,860
[45] Date of Patent: Jan. 16, 1990

[54] TRUNK INTERFACE CIRCUITRY FOR TELEPHONE SYSTEMS

[75] Inventors: Vincent V. Korsky, Shelton; Rajmund Krzyszczyk, New Britain; Jin T. Lim, Trumbull, all of Conn.

[73] Assignee: TIE/communications, Inc., Shelton, Conn.

[21] Appl. No.: 203,722

[22] Filed: Jun. 7, 1988

[51] Int. Cl.$^4$ .................. H04M 3/22; H04M 7/14
[52] U.S. Cl. ..................... 379/240; 379/234; 379/398
[58] Field of Search ............ 379/240, 234, 236, 237, 379/385, 398

[56] References Cited

U.S. PATENT DOCUMENTS

| 3,838,224 | 9/1974 | Richards | 379/382 |
| 4,563,547 | 1/1986 | Booth | 379/342 |
| 4,776,007 | 10/1988 | Styrna et al. | 379/234 |

Primary Examiner—Thomas W. Brown
Attorney, Agent, or Firm—Amster, Rothstein & Ebenstein

[57] ABSTRACT

This invention relates to improved trunk interface circuitry for telephone system common equipment, which is used to connect a local customer system to a central office of the telephone company. The improved trunk interface comprises an active two-terminal current sink for limiting the loop current in a non-linear manner, and means for monitoring the voltage across the trunk line which comprises a voltage-to-pulse width converter. The voltage-to-pulse width converter is designed to operate with a microprocessor which measures the time it takes to linearly discharge a capacitor which has been charged to the line voltage.

12 Claims, 5 Drawing Sheets

RELAY CONNECTION TABLES

Table I - Loop Start Configuration

| Trunk State | Relay 1 | Relay 2 | Relay 3 |
|---|---|---|---|
| On-Hook | 4 - 8 opened<br>4 - 6 closed<br>13 - 9 opened<br>13 - 11 closed | 4 - 8 closed<br>4 - 6 opened<br>13 - 9 closed<br>13 - 11 opened | 13 - 9 opened<br>13 - 11 closed |
| Off-Hook | 4 - 8 closed<br>4 - 6 opened<br>13 - 9 closed<br>13 - 11 opened | 4 - 8 opened<br>4 - 6 closed<br>13 - 9 opened<br>13 - 11 closed | 13 - 9 opened<br>13 - 11 closed |
| Pulse Dial Break | 4 - 8 opened<br>4 - 6 closed<br>13 - 9 opened<br>13 - 11 closed | 4 - 8 closed<br>4 - 6 opened<br>13 - 9 closed<br>13 - 11 opened | 13 - 9 opened<br>13 - 11 closed |
| Pulse Dial Make | 4 - 8 closed<br>4 - 6 opened<br>13 - 9 closed<br>13 - 11 opened | 4 - 8 opened<br>4 - 6 closed<br>13 - 9 opened<br>13 - 11 closed | 13 - 9 closed<br>13 - 11 opened |

Table II - Ground Start Configuration

| Trunk State | Relay 1 | Relay 2 | Relay 3 |
|---|---|---|---|
| On-Hook | 4 - 8 opened<br>4 - 6 closed<br>13 - 9 opened<br>13 - 11 closed | 4 - 8 opened<br>4 - 6 closed<br>13 - 9 opened<br>13 - 11 closed | 13 - 9 opened<br>13 - 11 closed |
| Service Request | 4 - 8 opened<br>4 - 6 closed<br>13 - 9 opened<br>13 - 11 closed | 4 - 8 opened<br>4 - 6 closed<br>13 - 9 opened<br>13 - 11 closed | 13 - 9 closed<br>13 - 11 opened |
| Off-Hook | same as for loop start | | |
| Dial - Break | same as for loop start | | |
| Dial - Make | same as for loop start | | |

FIG. 6.

TRUNK INTERFACE CIRCUITRY FOR TELEPHONE SYSTEMS

BACKGROUND OF THE INVENTION

This invention relates to telephone system common equipment which is used to connect a local customer system to a central office of the telephone company and, more particularly, to novel circuitry for the interface connection.

In the telephone system, customer-owned common equipment, (or customer premise equipment, as it is sometimes called) is used to connect a local customer-owned telephone network to lines or "trunks" which come from to a central office of the telephone company. The major types of common equipment in use today include Private Branch Exchange (PBX) systems, Key Service Unit (KSU) systems, or hybrid combinations of the two. PBX systems generally use "2500 set" telephones which have only the standard 12-button dialing keypad. The PBX system automatically selects an available trunk line when service is requested by the handset being lifted out of its cradle or taken "off-hook". Additional features are incorporated in PBX systems by depressing various combinations on the standard keypad. KSU systems are used with telephones which have auxiliary buttons or "key" switches in addition to the standard keypad. These switches may be used for directly selecting and accessing desired trunk lines, as well as for implementing special functions. In all these systems, trunk interface circuitry provides the interface between the local system and the lines of the central telephone office.

The interface circuitry must include a DC termination, which is switched in to signal the central office that service is requested. When the DC termination is switched in, a current loop is formed in the two wires of the line between the common equipment and the central office, and means at the central office which detect the presence of the current flow provide an available line and supply a dial tone. This is a typical sequence which occurs in the standard "loop start" operating mode commonly used by KSU Systems.

PBX Systems generally utilize a different signalling mode between the central office and the common equipment called "ground start". In this mode, when service is requested by a subscriber telephone going "off-hook", one wire of the 2 wire trunk line is grounded. The central office responds by grounding the other wire of the line (if that line is available), and a loop current is thereby established, as before. Similarly, when the central office is transmitting an incoming call to the common equipment, it will ground one end of the line, and wait for the common equipment to acknowledge that the subscriber line is available by grounding the other end, thereby closing the loop current path. This "handshake" ground signalling procedure ensures that an outgoing phone call is not inadvertently connected with an incoming call on the same line, as can sometimes happen with a "loop start" configuration. Trunk interface circuitry designed for universal operation should provide for both "loop start" and "ground start" configurations.

The interface circuitry must also incorporate a detector to monitor the presence of the incoming "ring" signal as well as the presence, and preferably the value, of the DC line current. The value of DC line current established when the current loop is closed will vary significantly depending upon the distance between the common equipment and the central office, due to the resistance along the length of the line. Transmission gain equalization may be introduced in the system to compensate for the different lengths of the central office lines.

Still another function of the interface circuit is to provide a two-wire to four wire conversion, commonly known as a hybrid, to separate the bidirectional voice signals which are generally provided by the central office into two unidirectional signals which are utilized internally in the common equipment and in the individual telephone stations which the common equipment services. The four-wire unidirectional signals enable the use of voice band digitizing CODEC (i.e. coder plus decoder) equipment as well as other advanced digital electronics which are unidirectional in nature. It is also desirable for the trunk interface circuitry to allow for dial-pulse operation of older rotary dial telephones which may be in use at the customer's location and to support general supervisory functions to monitor the state of the overall system.

A subscriber telephone is connected through the local common equipment to a central office that contains switching equipment, signalling equipment and batteries that supply direct current to operate the telephone line. A DC termination is necessary for each line in order to control the current which flows in the line. The central office generally provides a line consisting of a two-wire connection. One of the wires is called TIP (or "T") and the other is called RING (or "R"). This terminology refers to the tip and ring parts of the plug which was used to make connections in manual switchboards. The switches in the central office respond to the presence of current flow in the line to establish a connection between the calling phone and the called phone. When the connection is established, the two telephones communicate over transformer coupled loops using the current supplied by the central office batteries.

A battery of approximately 48 volts is connected between the TIP and RING wires at the central office, with the TIP usually being connected to the positive side of the battery. As an example, when a telephone is in the idle, or "on-hook" condition, the DC circuit between the telephone and the central office is open and no current flows. However, when the telephone is placed "off-hook", the loop circuit to the central office is closed, and battery voltage at the central office causes current to flow. The current flow signals the central office to provide a dial tone to the line when it is ready to place the line in service.

A DC termination at the local end of the loop is required to limit the current flow to levels which are acceptable by the central office. The loop remains closed as long as the line is in use. The termination, in addition to limiting current, must therefore also provide a high impedance to the audio signals which are present on the line during conversation. To meet this requirement, an inductive element is desirable. In prior art designs, the transformer coupling network in the hybrid section has been used to additionally provide the necessary DC termination (typically 400 ohms). However, since a current of up to 120 milliamps will flow through the transformer winding, the transformer must be of sufficient size to support this high current without magnetic field saturation. The requirement for large transformers not only makes the equipment bulky, but leads to an increase in cost. Other prior art systems have marginally improved the design by incorporating a separate inductive element in front of the hybrid transformer to provide the proper termination path, and a capacitor to block the DC from the hybrid transformer. Although this allows the use of smaller hybrid transformers, the problem of saturation is now shifted to the single inductor element, and the inductor must again be suitably sized to avoid saturation.

Furthermore, these prior art designs provide a DC resistance path which is linear in character. The total resistance of the current loop is determined not only by the DC termination resistance, but also in large measure by the length of the current loop. This, of course, depends on the distance between the local subscriber equipment and the central office. In order to insure that a minimally acceptable current level flows through the loop for the case where the central office and subscriber are far away, a fixed resistance termination necessarily results in high current levels when the central office and the subscriber equipment are near each other. This results in undesirable increased power dissipation at the termination which can adversely affect adjacent circuitry in the trunk interface.

SUMMARY OF THE INVENTION

Accordingly, it is an object of this invention to provide for an improved trunk interface circuit having a novel DC termination circuit element and line monitor circuit element.

It is an other object of this invention to provide for a DC termination which permits the use of smaller transformers in the hybrid section of the trunk interface, than previously attainable with prior art designs, and which results in less power dissipation under various line conditions than previously attainable in the prior art.

It is yet another object of this invention to provide a DC termination in the form of a two-terminal current sink device which provides a DC current path to limit the current for short loops, and which exhibits high impedance at voice band frequencies.

It is a further object of this invention to provide a line condition monitor circuit in the form of a voltage-to-pulse width converter, which has a high impedance input and which can replace a multiplicity of prior art line condition detectors.

It is a still further object of this invention to provide an improved line condition monitor in the form of a voltage to-pulse width converter which provides means for precisely monitoring the value of line current, the ringing signal, and various other "off-hook", and "on-hook" conditions, in a manner which is easily interfaced to but yet electrically isolated from computer control and which is operative with both "loop-start" and "ground-start" configurations.

Additionally, it is an object of this invention to provide trunk interface circuitry which has improved capabilities to permit the programmability of detection thresholds, which have been traditionally fixed in the prior art. This lowers the cost of manufacturing and provides greater compatibility with different international requirements.

In accordance with the foregoing objects, the improved trunk interface circuitry of this invention includes two novel circuit elements which comprise an active DC termination, and a line condition monitor in the form of a voltage to pulse width converter.

The trunk interface of this invention incorporates an active two-terminal current sink for the DC termination have fixed resistance. The transfer characteristic of this active current sink provides sufficient current for long loops, while limiting the current for short loops. In addition, it exhibits the required high impedance at voice band frequencies. The termination behaves like a large inductor carrying DC current, but with a current-limiting characteristic. When this DC termination circuit is used, the DC current is diverted from the hybrid transformers, permitting the use of much smaller and cheaper transformers.

Another aspect of this invention is the incorporation into the trunk interface of an improved, yet simple, circuit which is easily interfaced to computer control, and which provides an accurate measurement of the voltage across the line. Since this voltage varies with the status and length of the line, monitoring of the voltage permits microprocessors in the interface to sense changes in the status and condition of the line, and provide appropriate supervisory responses, e.g. transmission gain equalization and the setting of detection thresholds.

The line monitor circuit comprises a voltage-to-pulse width converter, the output of which is optically coupled to the microprocessor controller, thereby maintaining full isolation between the circuitry. The voltage measurement is initiated by the controller. By converting the line voltage to a time measurement, extremely accurate and reliable measurements can be achieved by utilizing the precise clock circuitry of the microprocessor.

BRIEF DESCRIPTION OF THE DRAWINGS

The foregoing, and other objects, features and advantages of the invention will be apparent from the following more particular description of a preferred embodiment of the invention, as illustrated in the accompanying/drawings wherein.

Table I relates to a loop-start configuration, while Table II corresponds to a ground start configuration.

DETAILED DESCRIPTION

The basic operation of the DC current sink circuit is now described with reference to the simplified circuit shown in FIG. 1. Terminals A and B are connected to the two wires of the trunk line, which are connected to the central office battery voltage. Voltage $V_{ab}$ represents the battery voltage reduced by the voltage drop along the length of the loop. The voltage-current characteristic of the device is schematically illustrated in FIG. 2. As seen, negligible current flows through the current sink until the base emitter junctions of transistors 111 and 12 20 are biased into forward conduction. For silicon devices, the forward diode drop, $V_d$, is approximately 0.6 volts. Transistor 113 is biased off until voltage $V_{ab}$ rises to sustain an additional diode drop. Under the condition when transistor 113 is off, the current drawn by the circuit is $(V_{ab}-2V_d)/R_{14}$, where $R_{14}$ is the value of resistor 14.

Figure 1:
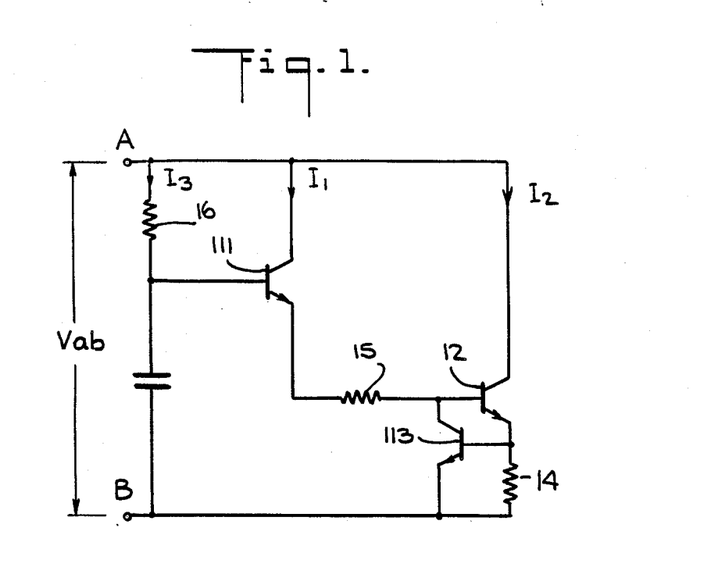
FIG. 1 is a schematic diagram of the basic current sink circuit which comprises a DC termination in a trunk interface.
Figure 2:
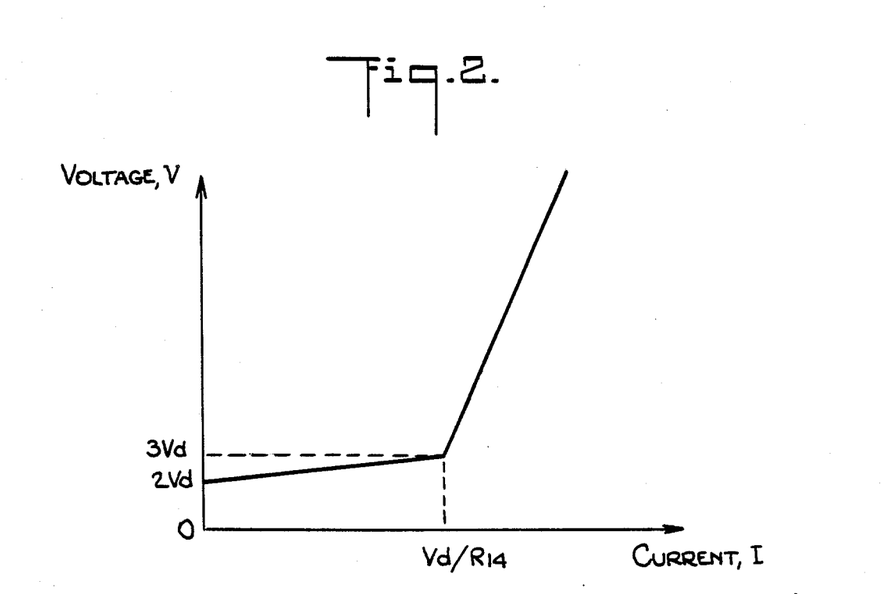
FIG. 2 shows the voltage-current characteristic of the current sink circuit.

When $V_{ab}$ exceeds $3V_d$, transistor 113 turns on. At this point, transistors 12 and 113 in combination with resistor 14 form a constant current source having the following characteristics:

$$I_2=V_d/R_{14}, I_1=(V_{ab}-3V_d)/R_{15}, \text{ and } I_3<<I_2$$

where $I_1$, $I_2$, $I_3$ are the currents in the circuit as shown in FIG. 1, and $R_{15}$ is the value of resistor 15. The slope of the characteristic in this operating regime is now steeper. The non linear DC impedance exhibited by the voltage-current characteristic of FIG. 2 provides sufficient current flow in long loops to satisfy central office requirements, but yet limits current flow in short loops to reduce the overall power drop in the termination.

The AC impedance characteristic is determined by capacitor 17. Specifically, the AC impedance, Z, of the $I_1$ current path is given by $Z=R_{15}+jwC_{17}R_{16}R_{15}$, where $C_{17}$ is the value of capacitor 17. As shown, the AC impedance can be described by an equivalent series inductance $C_{17}R_{16}R_{15}$. Similarly, the current paths of $I_3$ and $I_2$ also present high impedances since the value of resistor 16 is high by selection, and the collector impedance of transistor 12 is also high.

Figure 3:
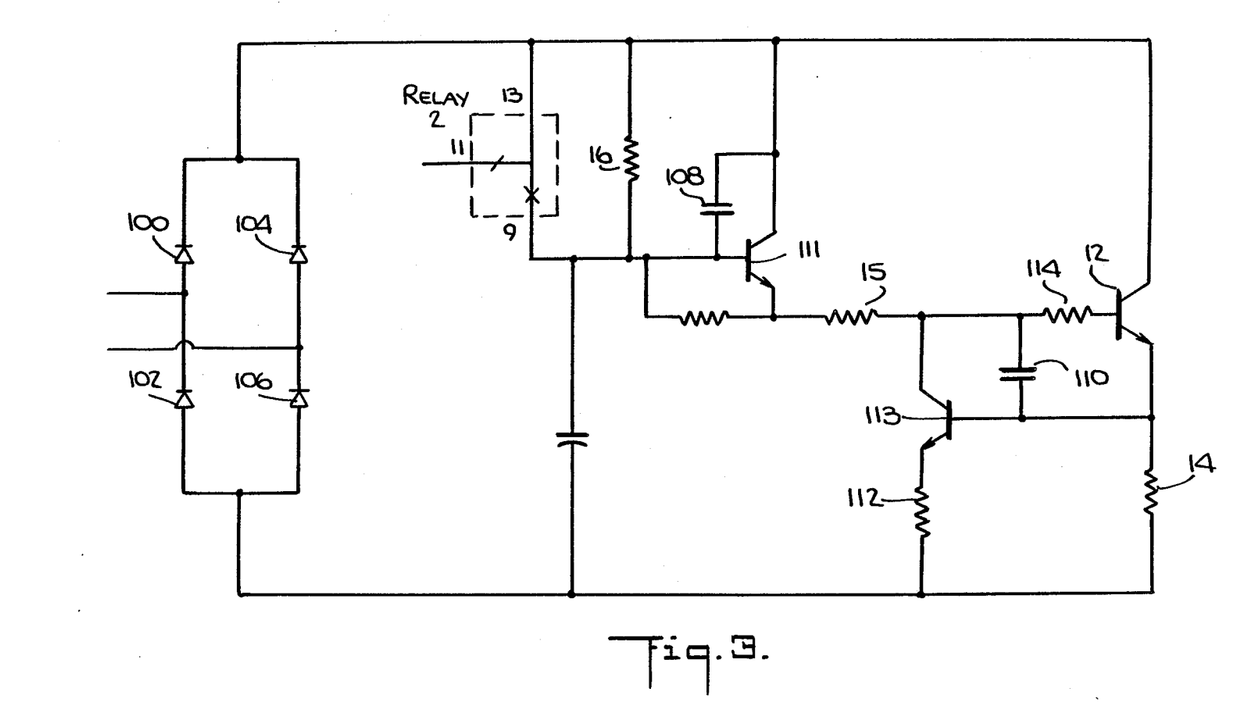
FIG. 3 shows a more detailed embodiment of the current sink circuit, for use in a trunk interface.

A more detailed embodiment of the circuit used in the trunk interface is shown in FIG. 3. Several additional components are added for practical reasons as follows: (a) diodes 100, 102, 104 and 106 form a polarity guard bridge so that the circuit operates with either polarity connection of the central office lines; (b) Relay 2 has normally open contacts 9–13 which are closed during a pulse-dialing operation. When closed, resistor 16 is bypassed and the circuit reverts to a low impedance so that the dialing pulses may pass without distortion; c) capacitors 108 and 110 as well as resistors 112 and 114 enhance the stability of transistor operation and protect against unwanted parasitic oscillations.

Figure 4:
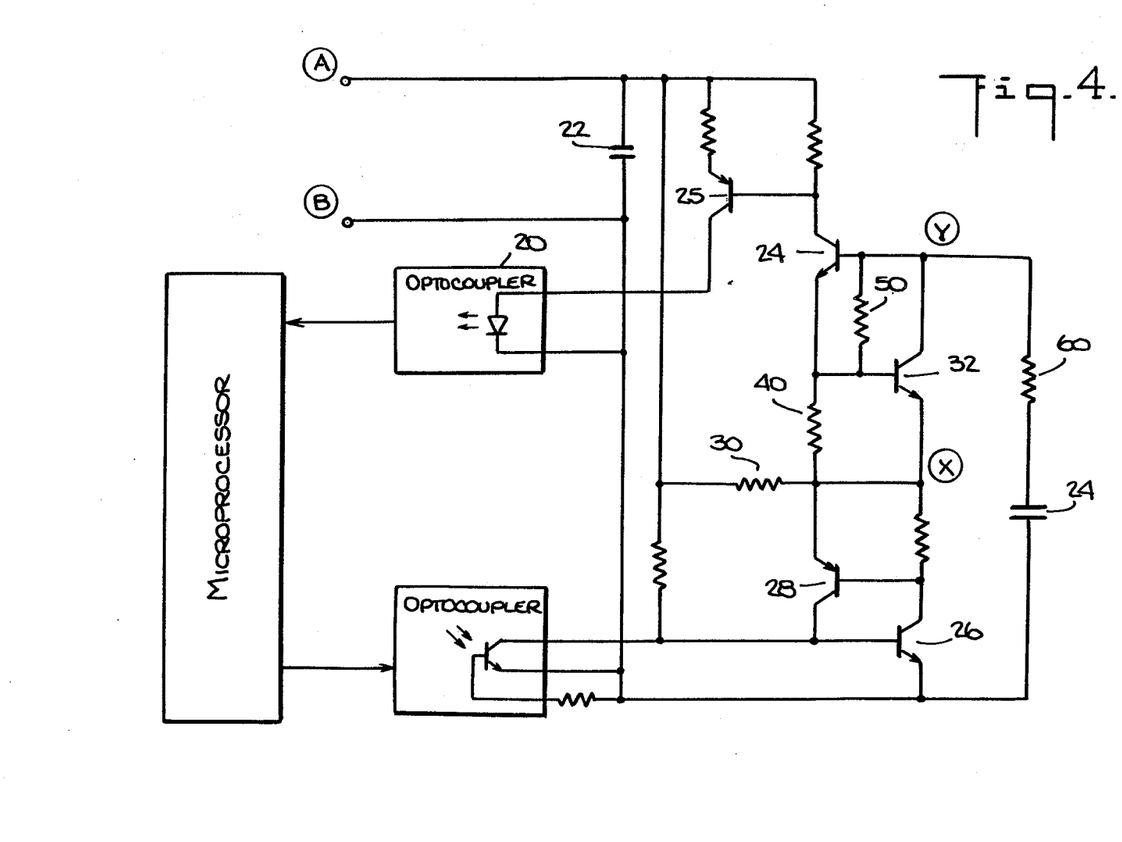
FIG. 4 is a schematic diagram of the voltage-to-pulse width converter circuit.

The second novel circuit element included in the improved trunk interface circuit disclosed herein is a line condition monitor which comprises a voltage-to-pulse width converter (VPC). Operation of the basic VPC circuit can be best understood with reference to FIG. 4. The circuit converts a voltage appearing across points A and B, $V_{ab}$, into a temporal pulse having a width that is proportional to $V_{ab}$. The pulse width is measured by a microprocessor in the trunk interface to determine the value of $V_{ab}$, and thereby the state and condition of the line at any point in time. With reference to FIG. 4, opto couplers 10 and 20 provide coupling as well as isolation of signals to and from the microprocessor. Before a voltage measurement is performed, microprocessor switches on opto-coupler 10. This turns off all the transistors in the VPC circuit, and enables capacitor 24 to charge to the potential $V_{ab}$ through resistor chain 30, 40, 50 and 60. To initiate a voltage measurement, the microprocessor turns off opto-coupler 10. Transistor pair 26 and 28, which are connected in an SCR configuration, turn on rapidly and cause the potential at point X to be pulled down to the potential of point B. Point Y is at the potential of Point A as a consequence of capacitor 24 being charged to the value at point A. Transistors 32 and 24, also turn on at this point, and as a consequence opto coupler 20 is turned on through transistor 25. The turn-on of opto-coupler 20 represents the beginning of the pulse width measurement. Transistors 32 and 24 operate in a standard current source configuration, and as a result, capacitor 24 is forced to discharge at a constant current rate, until the voltage across it falls below a value large enough to sustain the forward diode drops in the transistors. When this occurs, the current source transistor pair 32 and 24 turn off, thereby turning off transistor 25 and opto coupler 20. Turn-off of opto-coupler 20 defines the end of the output pulse. Thus the width of the output pulse, i.e. the time during which opto coupler 20 is on, is determined by the time of discharge of the capacitor from $V_{ab}$ to $V_d$ (0.6 v). Since the capacitor is forced to discharge at a linear rate by action of the current source transistor pair 32 and 24, the time of discharge as measured by the time opto-coupler 20 is on, is directly proportional to voltage $V_{ab}$ across input capacitor 22. Turn on and turn off of opto-coupler 20 provide start and stop signals to a counter in the microprocessor, thereby providing accurate measurement of the on time of opto-coupler 20. Accurate measurement of this time interval provides an accurate value for voltage $V_{ab}$. Since this voltage changes depending upon the status and condition of the line, the microprocessor, by interfacing to the VPC circuit, is able to monitor line status and condition with great accuracy. The VPC circuit effectively replaces a multiplicity of circuit elements used in the prior art to perform the same monitoring function.

Figure 5:
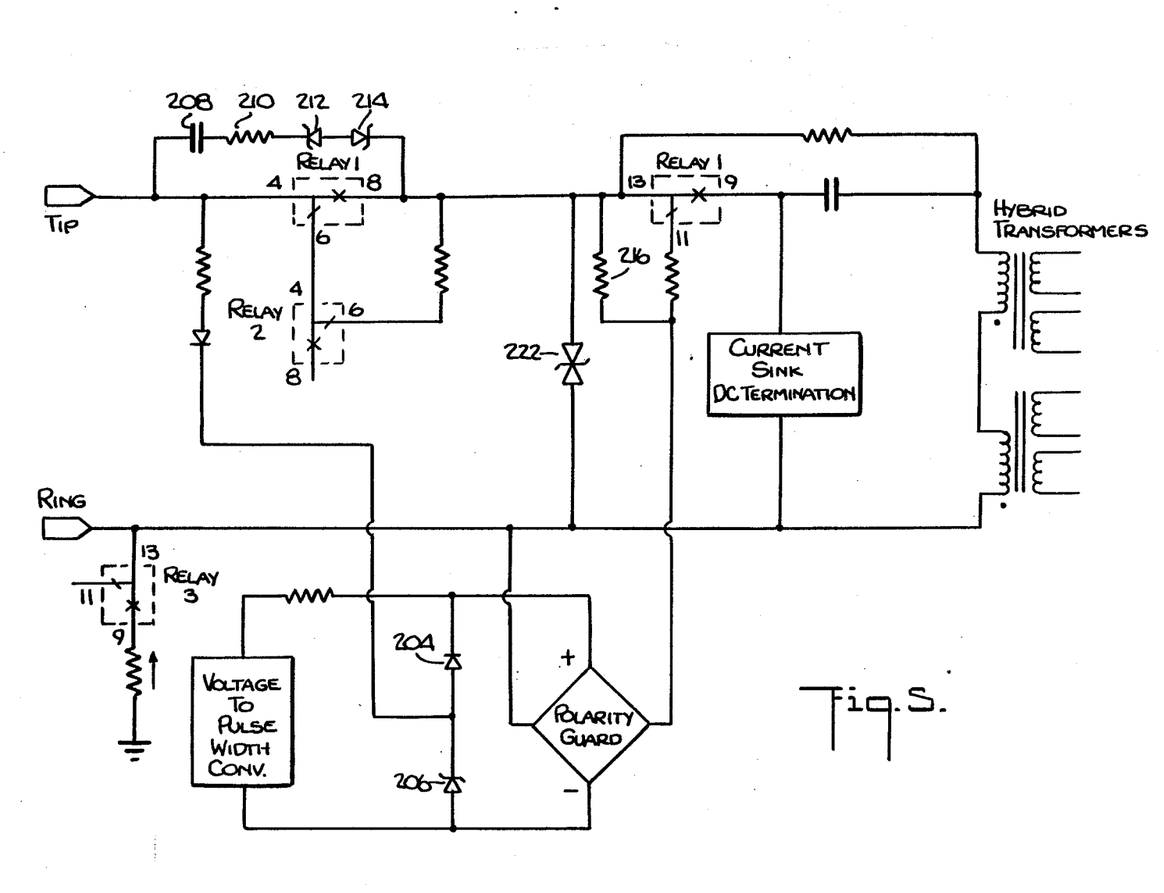
FIG. 5 is a schematic diagram of the front end of the Trunk Interface circuit, and shows in particular an embodiment in which the current sink DC termination and the voltage-to-pulse width converter are incorporated.
Figure 6:
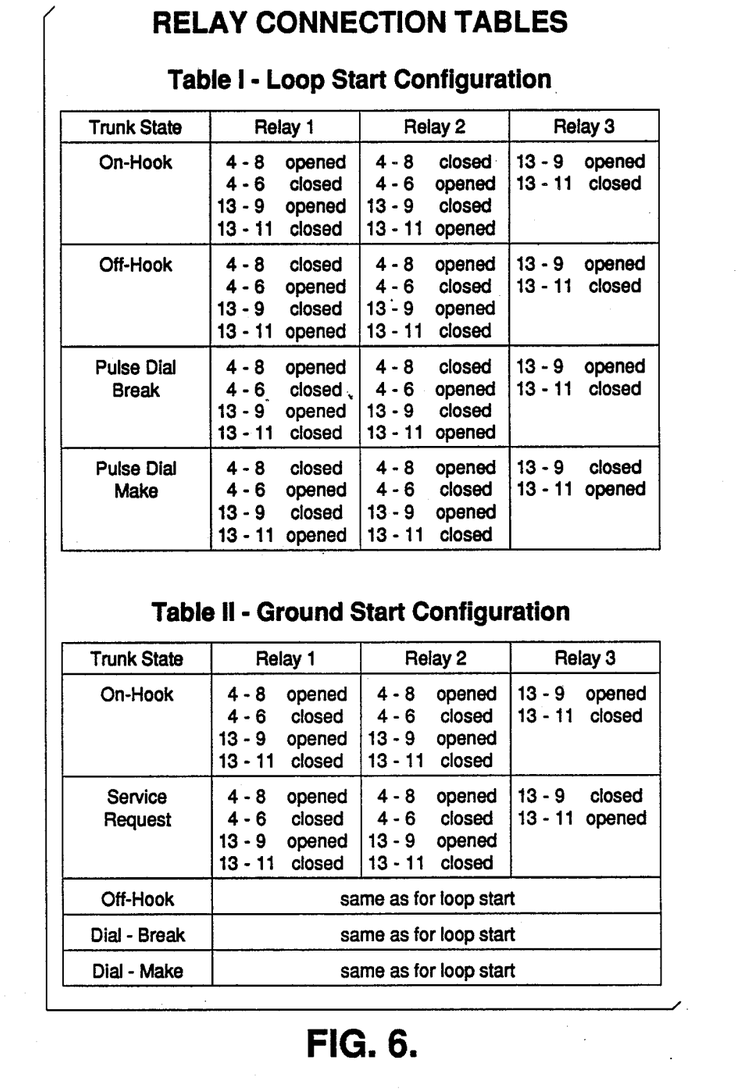
FIG. 6 displays two tables of relay connections for the three relays indicated in FIGS. 3 and 5, and shows the positions of the individual relay contacts for a number of line conditions which occur in the trunk interface.

An embodiment of the complete trunk interface circuit, which incorporates the active non-linear current sink as well as the voltage-to pulse width converter as a line condition monitor is shown in FIG. 5. Table I of FIG. 6 shows the position of relay contacts for the three relays in FIGS. 3 and 5 under different line conditions for a loop-start configuration while Table II shows the same information for a ground-start configuration. The functioning of the trunk interface circuitry will now be described more fully with reference to FIG. 5 and Table I of FIG. 6 wherein consideration will first be given to line conditions under the standard loop start configuration.

LOOP START

On-hook (idle): Contacts 9–13 of relay 1 are open and disconnect the current sink from the loop so that no DC current flows. The central office battery voltage, if it is of proper polarity, (ring negative) is sensed by the VPC through resistor 200, polarity diode 202, and diode 204. The polarity guard bridge insures that the VPC circuitry always senses the proper polarity for operation. Zener diode 206 acts to limit the voltage to the input of the VPC circuitry.

On hook (ringing): In this state the relay contacts remain as in the on-hook (idle) state. The low frequency 15–68 Hz ringing signal is sensed by the AC input network consisting of capacitor 208, resistor 210 and Zener diodes 212 and 214. The AC signal continues through the parallel resistor combination of 216 and 218 and enters the polarity guard bridge to the voltage-to-pulse width converter. Transient suppressor 222, which has a voltage-current characteristic of two back to-back Zener diodes, provides protection against transients and limits the AC ringing voltage applied to the VPC circuit.

Off-hook (communication state): During loop seizure, relays 1 and 2 are switched as shown in Table I. The current sink is now in the circuit and acts to limit the loop current as described above. The corresponding voltage which now appears across the input line is routed through resistor 216 to the polarity guard input of the VPC circuit. As illustrated above, the voltage appearing at the input lines is now a measure of the loop length. The microprocessor is able to monitor the input voltage, and thereby the loop current, through the voltage-to-pulse width converter. The loop current as measured by the microprocessor is used to provide transmit/receive gain control which compensates for loop length. For long loop situations where the current drops below a predetermined value, the microprocessor provides additional compensation.

Pulse dialing: For systems which accommodate rotary pulse dialing telephones, the interface circuit switches relay 2 as shown in Table 1. This relay now shorts across resistor 16 of the DC termination circuit (FIG. 3) and insures that the inductive impedance which this circuit normally presents is removed so that out-going dial pulses are not distorted. Voltage measurements during pulse dialing are normally disregarded by the microprocessor. With reference to FIG. 5 and Table II of FIG. 6, we now consider the line condition is for the standard ground start configuration.

Ground Start:

On-hook (idle): In the ground start configuration normally used by PBX equipment there is no DC voltage between TIP and RING during the on-hook (idle) condition.

On hook (ringing): Besides the AC path presented by capacitor 208, resistor 210 and Zener diodes 212 and 214, there is also a DC path through resistor 220. The ringing signal is normally superimposed on the DC voltage. As soon as DC voltage across TIP and RING is sensed by the VPC, and interpreted as a TIP grounding by the microprocessor, the trunk interface is prepared to monitor signals above the ring threshold.

Off-hook (communication state): Operation in this state is the same as in the loop start configuration.

Service request: In this mode, the trunk interface circuit grounds RING by contact closure of relay 3. The central office responds by grounding TIP. DC voltage then appears across TIP and RING and is sensed by the VPC circuitry as described above. After recognition of TIP grounding, relays 1 and 3 are activated to provide the standard off-hook current loop condition.

Pulse dialing: The interface circuitry functions in a manner identical to the loop-start mode, wherein relay 2 is activated to short across resistor 6 (FIG. 3) and ensure that the dialing pulses are not distorted by the high impedance of the current sink circuit.

Accurate monitoring of the voltage across the line also permits the common equipment to easily detect the presence of a bridged telephone across the line, without requiring additional connections to the common equipment as in prior art designs which do not accurately measure the line voltage. When a bridged telephone goes "off-hook" (this applies only to the loop-start configuration), the voltage at the input to the trunk interface drops below the open circuit central office battery value, due to the current flow through the loop. The VPC circuitry can readily sense the magnitude of the voltage to determine when this condition occurs.

In this manner, the desirable objects of the present invention are embodied in the trunk interface circuit. To summarize, the non-linear current sink used for the DC termination provides current-sinking requirements during off-hook conditions, while simultaneously limiting the loop current and associated power dissipation to low values. At the same time, it presents a high impedance at voice band frequencies so that these frequencies can pass to the hybrid transformers without distortion. Additionally, the trunk interface of this invention incorporates a novel voltage-to-pulse width converter to monitor the status and condition of the line, and to provide the microprocessor with means for obtaining accurate line voltage measurements. This enables the microprocessor to set different thresholds and sampling rates.

Furthermore, accurate loop current determination by way of line voltage measurement allows the microprocessor to provide improved transmission equalization to compensate for the variable loop lengths encountered in the telephone system. In addition, the presence of a bridged telephone across the incoming central office lines is easily detected without any circuit modification. In contrast to the prior art, all of these desirable supervisory functions are performed in a single circuit which is easily interfaced and optically isolated from the microprocessor circuitry.

Although the invention herein has been described with reference to particular embodiments, it is to be understood that these embodiments are merely illustrative aspects of the invention. Thus, it is to be understood that numerous modifications may be made in the illustrative embodiments and other embodiments may be devised without departing from the spirit and scope of the invention.

What is claimed is:

1. An interface circuit for interfacing a local telephone network to a trunk line of a central office of the telephone company which provides a DC voltage to said interface circuit comprising:
    (a) means for establishing a loop current path in the trunk line between a telephone of the local network and the central office;
    (b) means for limiting the current flow through the loop current path in a non-linear manner by providing a low DC resistance path at low values of said DC voltage, and a higher DC resistance path at higher values of said DC voltage, while maintaining a high impedance at voice band frequencies; and
    (c) means for measuring the voltage across the trunk line to monitor the condition and status of the trunk line.

2. The interface circuit of claim 1 wherein the means for limiting current flow through the current path further comprises an active two-terminal current sink.

3. The interface circuit of claim 1 wherein the means for limiting the current flow through the current path comprises an active two-terminal current sink having means for switching said high impedance at voice band frequencies to a low impedance so that outgoing dial pulses transmitted to the central office are not distorted.

4. The interface circuit of claim 1 wherein the means for measuring the voltage across the trunk line comprises a voltage-to-pulse width converter.

5. The interface circuit of claim 4 which further comprises a microprocessor and wherein said voltage-to-pulse width converter comprises:
  (a) communication means for transmitting signals to and from said microprocessor;
  (b) means for charging a capacitor to the voltage across said trunk line;
  (c) means for discharging the voltage across the capacitor in a linear manner as a function of time upon receipt of a start signal from said microprocessor; and
  (d) means for providing a stop signal to said microprocessor at a time when the voltage across the capacitor has been fully discharged so that the time interval between the start and the stop signals is linearly related to the voltage across the trunk line.

6. An interface circuit for interfacing a local telephone network to a trunk line of a central office of the telephone company which provides a DC voltage to said interface circuit comprising:
  (a) means for establishing a loop current path in the trunk line between a telephone of the local network and the central office; and
  (b) means for limiting the current flow through the loop current path in a non-linear manner by providing a low DC resistance path at low values of said DC voltage, and a higher DC resistance path at higher values of said DC voltage while maintaining a high impedance at voice band frequencies.

7. The interface circuit of claim 6 wherein the means for limiting current flow through the loop current path further comprises an active two-terminal current sink.

8. The interface circuit of claim 6 wherein the means for limiting current flow through the current path comprises an active two-terminal current sink having means for switching said high impedance at voice band frequencies to a low impedance so that outgoing dial pulses transmitted to the central office are not distorted.

9. An interface circuit for interfacing a local telephone network to a trunk line of a central office of the telephone company comprising:
  (a) means for establishing a loop current path in the trunk line between a telephone of the local network and the central office; and
  (b) a voltage-to-pulse width converter for measuring the voltage across the trunk line to monitor the condition and status of the trunk line.

10. The interface circuit of claim 9 which further comprises a microprocessor and wherein said voltage-to-pulse width converter comprises:
  (a) communication means for transmitting signals to and from said microprocessor;
  (b) means for charging a capacitor to the voltage across the trunk line;
  (c) means for discharging the voltage across the capacitor in a linear manner as a function of time upon receipt of a start signal from said microprocessor; and
  (d) means for providing a stop signal to said microprocessor at a time when the voltage across the capacitor has been fully discharged so that the time interval between the start and the stop signals is linearly related to the voltage across the trunk line.

11. The interface circuit of claim 10 wherein said voltage-to-pulse width converter further comprises two opto-couplers for maintaining complete electrical isolation between the voltage-to-pulse width converter and the microprocessor.

12. The interface circuit of claim 11 wherein the first opto-coupler comprises means for sending a start signal from the microprocessor which activates the second opto-coupler, and wherein the full discharge of the capacitor initiates means for deactivating the second opto-coupler, said deactivation providing a stop signal to the microprocessor so that the time between start and stop signal is related to the voltage across the trunk line and may be accurately measured by the microprocessor.

* * * * *